United States Patent Office 3,389,147
Patented June 18, 1968

3,389,147
NOVEL 2-IMINO-1,3-DITHIOLES
Roger Williams Addor, Pennington, N.J., assignor to American Cyanamid Company, Stamford, Conn., a corporation of Maine
No Drawing. Filed Apr. 21, 1966, Ser. No. 544,122
5 Claims. (Cl. 260—327)

ABSTRACT OF THE DISCLOSURE 2-imino-1,3-dithiole and the hydrohalide salt thereof are provided as useful intermediates in the preparation of insecticides, acaricides and nematocides by phosphorylating said 2-imino-1,3-dithiole or its hydrohalide salt.

---

The present invention relates to a novel five-membered hetero-di-sulfur compound and to a process for preparing the same. More particularly, the invention relates to 2-imino-1,3-dithiole and the hydrohalide salt thereof represented by the general formula:

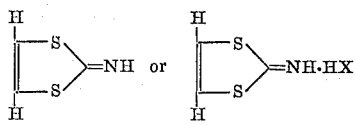

where X is a halogen, such as fluoro, chloro, bromo or iodo.

The 2-imino-1,3-dithiole or its corresponding halide salt finds utility as an intermediate in the preparation of highly effective pesticidal compounds. The latter are formed by reacting in substantially equimolar proportions 2-imino-1,3-dithiole with well known phosphorylating reagents, such as:

O,O-dimethyl phosphorochloridothioate,
O,O-diethyl phosphorochloridothioate,
O-methyl, O-ethyl phosphorochloridothioate,
O,O-di-isopropyl phosphorobromidothioate,
O,O-di-n-butyl phosphorochloridothioate,
O,O-di-sec-pentyl phosphoroiodothioate,
O,O-dimethyl phosphorochloridate,
O,O-diethyl phosphorochloridate,
O-ethyl ethane phosphonochloridothioate,
O-ethyl-N,N-dimethyl phosphoramidochloridothioate,
O-ethyl, phenylphosphonochloridothioate,
O-ethyl-N-isopropyl phosphoramidochloridothioate,
O-ethyl-N-methyl phosphoramidochloridothioate,
Diethylphosphorochloridotrithioate, and
Diethylphosphinothioyl bromide.

The phosphorylated imides of the present invention, are found to possess good pesticidal properties, finding utility as insecticides, acaricides and nematocides.

In accordance with the process of the invention, 2-imino-1,3-dithiole can be prepared by reacting substantially equimolar quantities of a cyanogen halide, preferably cyanogen chloride, with cis-1,2-dimercaptoethylene at temperatures ranging from about 20° C. to about 50° C. in the presence of an anhydrous acidified alcohol. Unexpectedly, the cis-1,2-dimercaptoethylene reactant which is unstable at room or elevated temperatures can be cyclized with a cyanogen halide notwithstanding the presence of an acid, such as hydrochloric acid. Rather, the acid would be expected to predominately hasten dimerization of the cis-1,2-dimercaptoethylene reactant. Contrary to this expectation, cyclization to 2-imino-1,3-dithiole occurs.

For a further understanding of the present invention, the following illustrative examples are presented.

Example 1.—Preparation of 2-imino-1,3-dithiole hydrochloride

To a suitable flask containing a mixture of 16.2 grams (0.18 mole) of cis-1,2-dimercaptoethylene in 50 milliliters of toluene containing 1% ethanol is added 12.5 grams (0.20 mole) of gaseous cyanogen chloride over a period of 45 minutes. The flask is surrounded with a water bath at 25° C. and dry hydrogen chloride is passed in slowly for 5 minutes. During this period, solids begin to form. After about 18 hours in the reaction, the toluene is decanted from the resulting mass of hard packed solids and dark gummy oil. Extraction of the solids with several portions of methanol leaves 10.8 grams of an insoluble gum. Evaporation of the filtrate gives a gummy brown oil converted after several days under vacuum over potassium hydroxide to a hard brittle solid.

The solids, after grinding, are stirred in benzene and saturated aqueous potassium bicarbonate solution is added in excess. After the water-benzene mixture is decanted from gummy material, the layers are separated and the aqueous phase is extracted again with benzene. The pale orange benzene solution is washed with saturated salt solution and passed through anhydrous sodium sulfate. Passage of dry hydrogen chloride over the cooled benzene mixture causes percipitation of solids which, after collection and washing with benzene, amounts to 3.3 grams of pale orange 2-imino-1,3-dithiole hydrochloride, melting point 167° C. (dec.) with darkening above 130° C. Slow sublimation at 80° C./0.2 mm Hg. of a portion of the crude product yields colorless crystals having a melting point equal to 177° C. (dec.) with darkening above 140° C.

On analysis, the following is found:
Calcd. for $C_3H_4ClNS_2$: C, 23.44; H, 2.60; Cl, 23.07; N, 9.12; S, 41.74. Found: C, 23.17; H, 2.42; Cl, 23.22; N, 9.28; S, 41.92.

On further analysis, the proton magnetic resonance spectrum shows single resonance peaks at $2.48\tau$ (olefinic proton) and $5.07\tau$ (N–H proton).

Substantially the same results are obtained when utilizing hydrogen bromide and cyanogen bromide in lieu of the corresponding hydrogen chloride and cyanogen chloride in the above example.

Example 2

This example illustrates the phosphorylation of a 2-imino-1,3-dithiole.

To 3.0 parts of 2-imino-1,3-dithiole hydrochloride in a mixture of 15 parts of 2:1 benzene:water is added 4.3 parts of potassium bicarbonate in several portions. After addition of 3.4 parts of diethyl phosphorochloridate over a 20-minute period, the mixture is stirred overnight. The organic layer is separated and the water layer is extracted with an ether-benzene mixture. The combined organic phases are washed with saturated salt solution, filtered through anhydrous magnesium sulfate, and concentrated in vacuo to give 3.9 grams (78% of theory) of crude 2-diethoxyphosphinylimino-1,3-dithiole as an orange oil which partially crystallized in the refrigerator. Several recrystallizations of a portion of the crude product from ether in a Dry Ice-acetone bath yields colorless crystals having a melting point equal to 46.6–48.0° C.

On analysis, the following is found:
Calcd. for $C_7H_{12}NO_3PS_2$: C, 33.19; H, 4.78; P, 12.23; S, 25.32. Found: C, 33.26; H, 5.15; P, 12.29; S, 25.21.

The infrared spectrum shows strong absorption at 1550 cm.$^{-1}$ assignable to the C=N group.

I claim:
1. A member selected from the group consisting of 2-imino-1,3-dithiole and the acid halide addition salt thereof.

2. The compound according to claim 1: 2-imino1,3-dithiole.

3. The compound according to claim 1: 2-imino-1,3-dithiole hydrohalide.

4. The compound according to claim 1: 2-imino-1,3-dithiole hydrochloride.

5. The compound according to claim 1: 2-imino-1,3-dithiole hydrobromide.

References Cited

UNITED STATES PATENTS 3,197,365  7/1965  Lovell _____ 167—33
3,197,481  7/1965  Addor _____ 260—327

JAMES A. PATTEN, *Primary Examiner.*